(12) United States Patent
Li et al.

(10) Patent No.: US 9,686,533 B2
(45) Date of Patent: Jun. 20, 2017

(54) 3D PANEL, METHOD FOR DRIVING 3D PANEL AND ELECTRONIC DEVICE

(71) Applicants: Shanghai Tianma Micro-Electronics Co., Ltd., Shanghai (CN); Tianma Micro-Electronics Co., Ltd., Shenzhen (CN)

(72) Inventors: Jialing Li, Shanghai (CN); Lei Niu, Shanghai (CN); Zhihua Ling, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 64 days.

(21) Appl. No.: 14/882,336

(22) Filed: Oct. 13, 2015

(65) Prior Publication Data
US 2016/0173861 A1    Jun. 16, 2016

(30) Foreign Application Priority Data

Dec. 16, 2014 (CN) .......................... 2014 1 0784201

(51) Int. Cl.
*H04N 13/04* (2006.01)
*G09G 1/06* (2006.01)
(Continued)

(52) U.S. Cl.
CPC ......... *H04N 13/0409* (2013.01); *G09G 3/003* (2013.01); *G09G 3/20* (2013.01);
(Continued)

(58) Field of Classification Search
CPC ...... H04N 13/0409; G09G 3/003; G09G 3/20; G09G 3/3614; G09G 3/3674
See application file for complete search history.

(56) References Cited

U.S. PATENT DOCUMENTS

| 2009/0174642 A1* | 7/2009 | Min | ..................... G09G 3/3614 345/92 |
| 2011/0032226 A1* | 2/2011 | Sasaki | .................. G09G 3/3677 345/205 |

(Continued)

FOREIGN PATENT DOCUMENTS

| CN | 102568417 A | 7/2012 |
| CN | 103152597 A | 6/2013 |

(Continued)

OTHER PUBLICATIONS

1st Office Action as received in corresponding Chinese Application No. 201410784201.5, dated Jan. 29, 2016.

*Primary Examiner* — Kevin M Nguyen
(74) *Attorney, Agent, or Firm* — Alston & Bird LLP

(57) ABSTRACT

In general, embodiments of the present invention provide a 3D panel, a method for driving the 3D panel, and an electronic device. The method includes: driving a first group of gate lines row by row and displaying a first image, in scanning a (4k+1)-th frame, k being a natural number; driving a second group of gate lines row by row and displaying a second image, in scanning a (4k+2)-th frame; driving the first group of gate lines row by row and displaying a third image, in scanning a (4k+3)-th frame; driving the second group of gate lines row by row and displaying a fourth image, in scanning a (4k+4)-th frame. Gate lines in the first group of gate lines and those in the second group are arranged alternately. Scanning directions of the (4k+1)-th frame and the (4k+3)-th frame are opposite. Scanning directions of the (4k+2)-th frame and the (4k+4)-th frame are opposite.

7 Claims, 8 Drawing Sheets

(51) Int. Cl.
  *G09G 3/20*  (2006.01)
  *G09G 3/00*  (2006.01)
  *G09G 3/36*  (2006.01)
(52) U.S. Cl.
  CPC ......... *G09G 3/3614* (2013.01); *G09G 3/3674* (2013.01); *G09G 2310/021* (2013.01); *G09G 2310/0218* (2013.01)

(56) References Cited

U.S. PATENT DOCUMENTS

| | | | |
|---|---|---|---|
| 2011/0149047 A1* | 6/2011 | Min | G02B 27/2264 |
| | | | 348/51 |
| 2011/0316989 A1* | 12/2011 | Imai | G02B 27/2214 |
| | | | 348/51 |
| 2012/0162172 A1 | 6/2012 | Lee et al. | |
| 2013/0141402 A1 | 6/2013 | Lee | |
| 2015/0002376 A1 | 1/2015 | Yang et al. | |
| 2015/0279332 A1 | 10/2015 | Hu et al. | |

FOREIGN PATENT DOCUMENTS

| | | |
|---|---|---|
| CN | 103176319 A | 6/2013 |
| CN | 103761946 A | 4/2014 |
| CN | 103903543 A | 7/2014 |
| CN | 103943084 A | 7/2014 |
| KR | 20100128019 A | 12/2010 |

\* cited by examiner

|    | S1 | S2 | S3 | S4 | S5 |
|----|----|----|----|----|----|
| G1 | +  | −  | +  | −  | +  |
| G2 | −  | +  | −  | +  | −  |
| G3 | +  | −  | +  | −  | +  |
| G4 | −  | +  | −  | +  | −  |
| G5 | +  | −  | +  | −  | +  |
| G6 | −  | +  | −  | +  | −  |
| G7 | +  | −  | +  | −  | +  |
| G8 | −  | +  | −  | +  | −  |

F12

|    | S1 | S2 | S3 | S4 | S5 |
|----|----|----|----|----|----|
| G1 | +  | −  | +  | −  | +  |
| G2 | −  | +  | −  | +  | −  |
| G3 | +  | −  | +  | −  | +  |
| G4 | −  | +  | −  | +  | −  |
| G5 | +  | −  | +  | −  | +  |
| G6 | −  | +  | −  | +  | −  |
| G7 | +  | −  | +  | −  | +  |
| G8 | −  | +  | −  | +  | −  |

3D PANEL, METHOD FOR DRIVING 3D PANEL AND ELECTRONIC DEVICE

CROSS REFERENCE TO RELATED APPLICATIONS

The present application claims the priority to Chinese Patent Application No. 201410784201.5, entitled "3D PANEL, METHOD FOR DRIVING 3D PANEL AND ELECTRONIC DEVICE", filed on Dec. 16, 2014 with the State Intellectual Property Office of People's Republic of China, which is incorporated herein by reference in its entirety.

FIELD OF THE INVENTION

The disclosure relates to 3D display technology, and particularly to a 3D panel, a method for driving the 3D panel, and an electronic device.

BACKGROUND OF THE INVENTION

In a 3D panel, common pixel units are classified into left-eye pixel units and right-eye pixel units. The left-eye pixel units and the right-eye pixel units may display the same information in a 2D displaying, and may respectively display a left-eye image and a right-eye image which have parallax in a 3D displaying.

When driving the 3D panel with a conventional technology to perform the 3D displaying, charging polarities of the pixel units can not be inversed between adjacent 3D images, which results in a ghosting problem during an image switch.

BRIEF SUMMARY OF THE INVENTION

In order to solve the problem described above, a 3D panel, a method for driving the 3D panel, and an electronic device are provided according to embodiments of the disclosure. When driving the 3D panel with the method to perform a 3D displaying, charging polarities of pixel units when displaying one 3D image are inversed with respect to polarities of pixel units when displaying an adjacent 3D image, and the ghosting problem during an image switch is eliminated.

A method for driving a 3D panel is provided in the disclosure. The 3D panel includes multiple gate lines. In a 3D displaying, the method includes:

driving a first group of gate lines row by row and displaying a first image, in a scan of a (4k+1)-th frame, where k is a natural number;

driving a second group of gate lines row by row and displaying a second image, in a scan of a (4k+2)-th frame;

driving the first group of gate lines row by row and displaying a third image, in a scan of a (4k+3)-th frame; and driving the second group of gate lines row by row and displaying a fourth image, in a scan of a (4k+4)-th frame, where one of the first image and the second image is a left-eye image and the other is a right-eye image; one of the third image and the fourth image is a left-eye image and the other is a right-eye image; gate lines in the first group of gate lines and gate lines in the second group of gate lines are arranged alternately; a scanning direction of the (4k+1)-th frame is opposite to that of the (4k+3)-th frame; and a scanning direction of the (4k+2)-th frame is opposite to that of the (4k+4)-th frame.

It can be know from the above description that, when applying the method provided in the disclosure to perform the 3D displaying, in one driving period, the scanning direction of the (4k+1)-th frame is set to be opposite to that of the (4k+3)-th frame, and the scanning direction of the (4k+2)-th frame is set to be opposite to that of the (4k+4)-th frame. Therefore, charging polarities of pixel units when displaying one 3D image constituted by the (4k+1)-th frame and the (4k+2)-th frame are inversed with respect to charging polarities of pixel units when displaying a next 3D image constituted by the (4k+3)-th frame and the (4k+4)-th frame, and the ghosting problem in 3D displaying is eliminated.

A 3D panel is further provided in the disclosure. The 3D panel includes:

multiple gate lines;

a gate driving circuit and a scanning direction controller;

where in a 3D displaying, the gate driving circuit is configured to drive a first group of gate lines row by row in a scan of a (4k+1)-th frame, to display a first image, where k is a natural number; drive a second group of gate lines row by row in a scan of a (4k+2)-th frame, to display a second image; drive the first group of gate lines row by row in a scan of a (4k+3)-th frame, to display a third image; and drive the second group of gate lines row by row in a scan of a (4k+4)-th frame, to display a fourth image; and the scanning direction controller is configured to control a scanning direction of the gate driving circuit, controls a scanning direction of the (4k+1)-th frame to be opposite to that of the (4k+3)-th frame; and controls a scanning direction of the (4k+2)-th frame to be opposite to that of the (4k+4)-th frame;

where one of the first image and the second image is a left-eye image and the other one is a right-eye image; one of the third image and the fourth image is a left-eye image and the other is a right-eye image; gate lines in the first group of gate lines are gate lines in odd-numbered rows and gate lines in the second group of gate lines are gate lines in even-numbered rows, or gate lines in the first group of gate lines are gate lines in even-numbered rows and gate lines in the second group of gate lines are gate lines in odd-numbered rows.

The method described above may be applied on the 3D panel to realize a 3D image displaying. As described above, charging polarities of pixel units when displaying one 3D image constituted by the (4k+1)-th frame and the (4k+2)-th frame are inversed with respect to charging polarities of pixel units of a next 3D image constituted by the (4k+3)-th frame and the (4k+4)-th frame, and the ghosting problem in 3D displaying is eliminated.

An electronic device is further provided in the disclosure. The electronic device includes the 3D panel described above. Therefore, when applying the electronic device to perform a 3D displaying, charging polarities when displaying one 3D image are inversed with respect to polarities when displaying an adjacent 3D image, and the ghosting problem in 3D displaying is eliminated.

BRIEF DESCRIPTION OF THE DRAWINGS

To more clearly illustrate technical solutions in embodiments of the disclosure or the conventional technology, drawings to be used in descriptions of the embodiments or the conventional technology are introduced simply hereinafter. Obviously, the drawings in the following description are just for the embodiments of the disclosure. For those skilled in the art, other drawings may also be obtained based on the provided drawings without paying any creative work.

FIG. 2 schematically illustrates the principle of a 3D displaying when applying the method shown in FIG. 1;

DETAILED DESCRIPTION OF THE INVENTION

In the following, technical solutions according to embodiments of the disclosure are described clearly and completely in conjunction with drawings in the embodiments of the disclosure. Obviously, the described embodiments are merely a part of rather than all of the embodiments of the disclosure. Other embodiments obtained by those skilled in the art based on the embodiments of the disclosure without paying any creative work all fall within the scope of protection of the disclosure.

Figure 1:
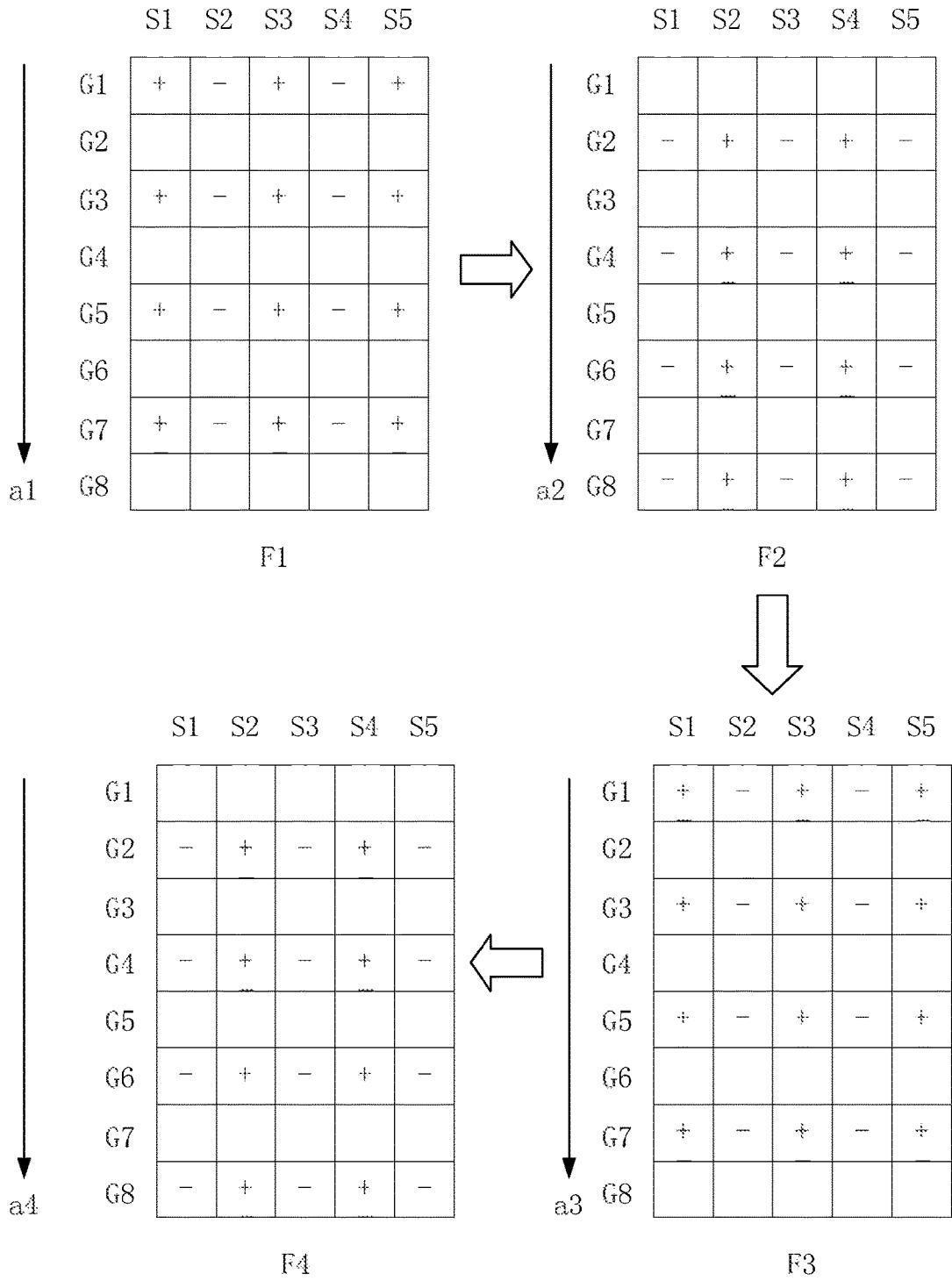
FIG. 1 depicts a schematic diagram of charging polarities of a 3D panel within one period when applying a conventional driving method.

Processes of driving a 3D panel with a conventional driving method to display a 3D image are shown with reference to FIGS. 1 and 2. FIG. 1 is a schematic diagram of charging polarities of a 3D panel within one period when applying the conventional driving method, and FIG. 2 schematically illustrates the principle of a 3D displaying when applying the driving method shown in FIG. 1. In an embodiment shown in FIG. 1, a 3D panel having 8×5 pixel units is taken as an example. The 3D panel includes 8×5 pixel units, a first gate line G1 to an eighth gate line G8, and a first data line S1 to a fifth data line S5.

In the 3D displaying implemented with the conventional driving method, the 3D panel has four charging states respectively in scanning a first frame F1, a second frame F2, a third frame F3 and a fourth frame F4. In scanning the first frame F1, all gate lines in odd-numbered rows are scanned, pixel units in all odd-numbered pixel rows are charged, and a left-eye image of a first 3D image F12 is displayed. In scanning the second frame F2, all gate lines in even-numbered rows are scanned, pixel units in all even-numbered pixel rows are charged, and a right-eye image of the first 3D image F12 is displayed. In scanning the third frame F3, all the gate lines in the odd-numbered rows are scanned, the pixel units in all the odd-numbered pixel rows are charged, and a left-eye image of a second 3D image F34 is displayed. In scanning the fourth frame F4, all the gate lines in the even-numbered rows are scanned, the pixel units in all the even-numbered pixel rows are charged, and a right-eye image of the second 3D image F34 is displayed.

In the conventional driving method, a scanning direction a1 of the first frame F1, a scanning direction a2 of the second frame F2, a scanning direction a3 of the third frame F3 and a scanning direction a4 of the fourth frame F4 are the same. As shown in FIG. 1, forward scans are performed downwardly in scanning the four frames F1-F4.

As shown in FIG. 2, when applying the conventional driving method to perform a switch from one 3D image to an adjacent 3D image, a ghosting problem exists on the 3D panel during the image switch since charging polarities of pixel units when displaying the second 3D image F34 are not inversed with respect to charging polarities of the pixel units when displaying the first 3D image F12.

Figure 3:
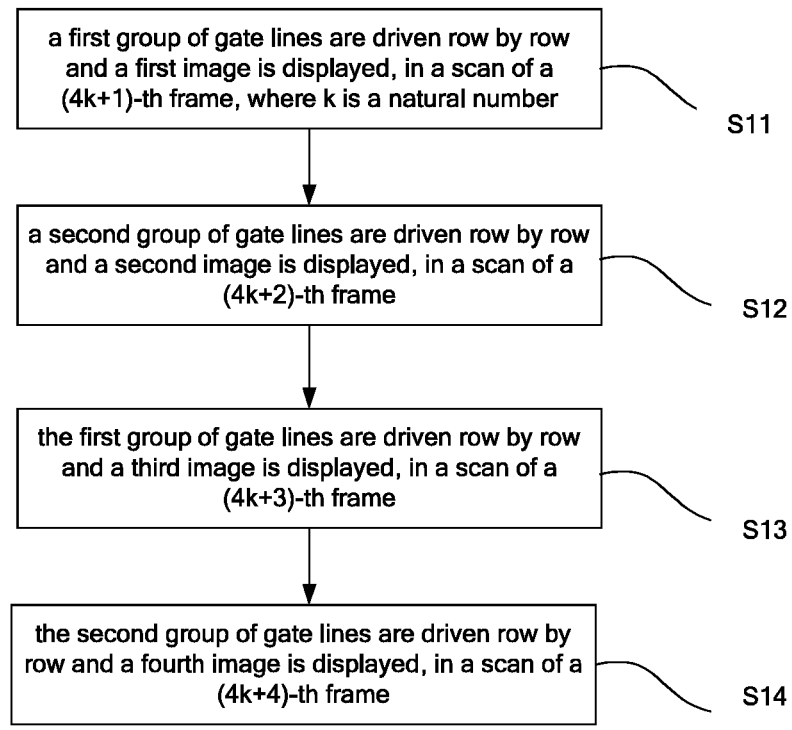
FIG. 3 depicts a schematic flow diagram of a method for driving a 3D panel according to an embodiment of the disclosure.

A method for driving a 3D panel according an embodiment of the disclosure is provided to solve the above problem. FIG. 3 is a schematic flowchart of the method for driving the 3D panel. The 3D panel includes multiple gate lines. In performing a 3D displaying, the method includes steps S11 to S14.

In step S11, a first group of gate lines are driven row by row and a first image is displayed, in a scan of a (4k+1)-th frame, where k is a natural number.

In the step S11, the first group of gate lines may be driven row by row through a forward scan, that is, respective gate lines in the first group of gate lines are scanned downwardly row by row. Alternatively, the first group of gate lines are driven row by row through a reverse scan, that is, respective gate lines in the first group of gate lines are scanned upwardly row by row.

In step S12, a second group of gate lines are driven row by row and a second image is displayed, in a scan of a (4k+2)-th frame.

In the step S12, the second group of gate lines may be driven row by row through a forward scan, that is, respective gate lines in the second group of gate lines are scanned downwardly row by row. Alternatively, the second group of gate lines are driven row by row through a reverse scan, that is, respective gate lines in the second group of gate lines are scanned upwardly row by row.

One of the first image and the second image is a left-eye image, and the other is a right-eye image. The gate lines in the first group of gate lines and the gate lines in the second group of gate lines are arranged alternately.

The 3D panel includes multiple pixel units arranged in an array, multiple gate lines each corresponding to one pixel row, and data lines each corresponding to one pixel column. Gate lines in even-numbered pixel rows are the first group of gate lines and pixel units in the even-numbered pixel rows are scanned to display the first image, and gate lines in odd-numbered pixel rows are the second group of gate lines and pixel units in the odd-numbered pixel rows are scanned to display the second image. Alternatively, gate lines in odd-numbered pixel rows are the first group of gate lines and pixel units in the odd-numbered pixel rows are scanned to display the first image, and gate lines in even-numbered pixel rows are the second group of gate lines and pixel units in the even-numbered pixel rows are scanned to display the second image.

In step S13, the first group of gate lines are driven row by row and a third image is displayed, in a scan of a (4k+3)-th frame.

A scanning direction of the (4k+1)-th frame is opposite to that of the (4k+3)-th frame.

In step S14, the second group of gate lines are driven row by row and a fourth image is displayed, in a scan of a (4k+4)-th frame.

A scanning direction of the (4k+2)-th frame is opposite to that of the (4k+4)-th frame.

The reverse scan may result in that a corresponding image is displayed upside down. Therefore, in the method mentioned above, a corresponding image is turned upside down before driving a group of gate lines on which the reverse scan needs to be applied, so that an upright image is displayed in case of the reverse scan.

Polarities of data signal need to be inversed between adjacent frames, to realize the 3D displaying. That is, the two adjacent frames of data signal have the same period and opposite phases. The two adjacent frames of data signal are respectively for displaying a left-eye image and a right-eye image of one 3D image. One frame of data signal includes high levels and low levels which are output alternately. In the embodiment of the disclosure, a duty cycle of the high level in each frame of data signal is set to be same as a duty cycle of the low level in each frame of data signal. In this case, since the scanning direction of the (4k+1)-th frame is opposite to that of the (4k+3)-th frame, charging polarities in scanning the (4k+3)-th frame are inversed with respect to charging polarities in scanning the (4k+1)-th frame; and since the scanning direction of the (4k+2)-th frame is opposite to that of the (4k+4)-th frame, charging polarities in scanning the (4k+4)-th frame are inversed with respect to charging polarities in scanning the (4k+2)-th frame. Therefore, polarities of the pixel units when displaying a second 3D image constituted by the (4k+3)-th frame and the (4k+4)-th frame are inversed with respect to polarities of the pixel units when displaying a first 3D image constituted by the (4k+1)-th frame and the (4k+2)-th frame, and the ghosting problem in the 3D displaying is eliminated.

It should be noted that, since the duty cycle of the high level is same as that of the low level in one frame of data signal, the sum of the number of high level and the number of low level is an even number in one frame of data signal. Correspondingly, the number of scans performed in scanning one frame is an even number. If one of the number of gate lines in odd-numbered rows and the number of gate lines in even-numbered rows of the 3D panel is not an even number, the number of the high level and the low level in one frame of data signal is not less than the number of the gate lines in odd-numbered rows and is not less than the number of the gate lines in even-numbered rows. At the end of the scanning of one frame, an empty scanning is performed on an additional gate line, to guarantee that, polarities of pixel units when displaying the left-eye image of one 3D image are inversed with respect to polarities of pixel units when displaying the right-eye image of the 3D image, polarities of pixel units when displaying the left-eye image of one 3D image are inversed with respect to polarities of pixel units when displaying the left-eye image of an adjacent 3D image, and polarities of pixel units when displaying the right-eye image of one 3D image are inversed with respect to polarities of pixel units when displaying the right-eye image of an adjacent 3D image.

Figure 4:
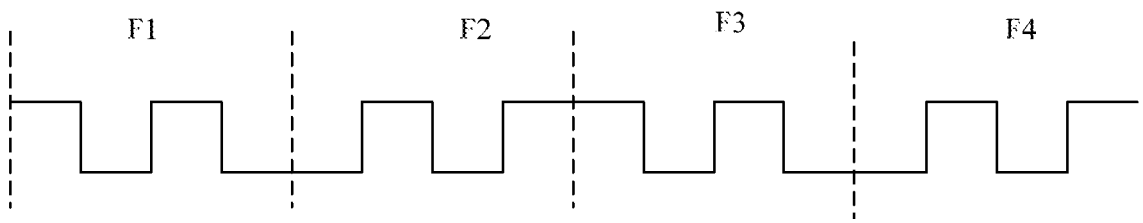
FIG. 4 depicts a waveform diagram of a data signal of a first data line S1 within one period according to an embodiment of the disclosure.
Figure 5:
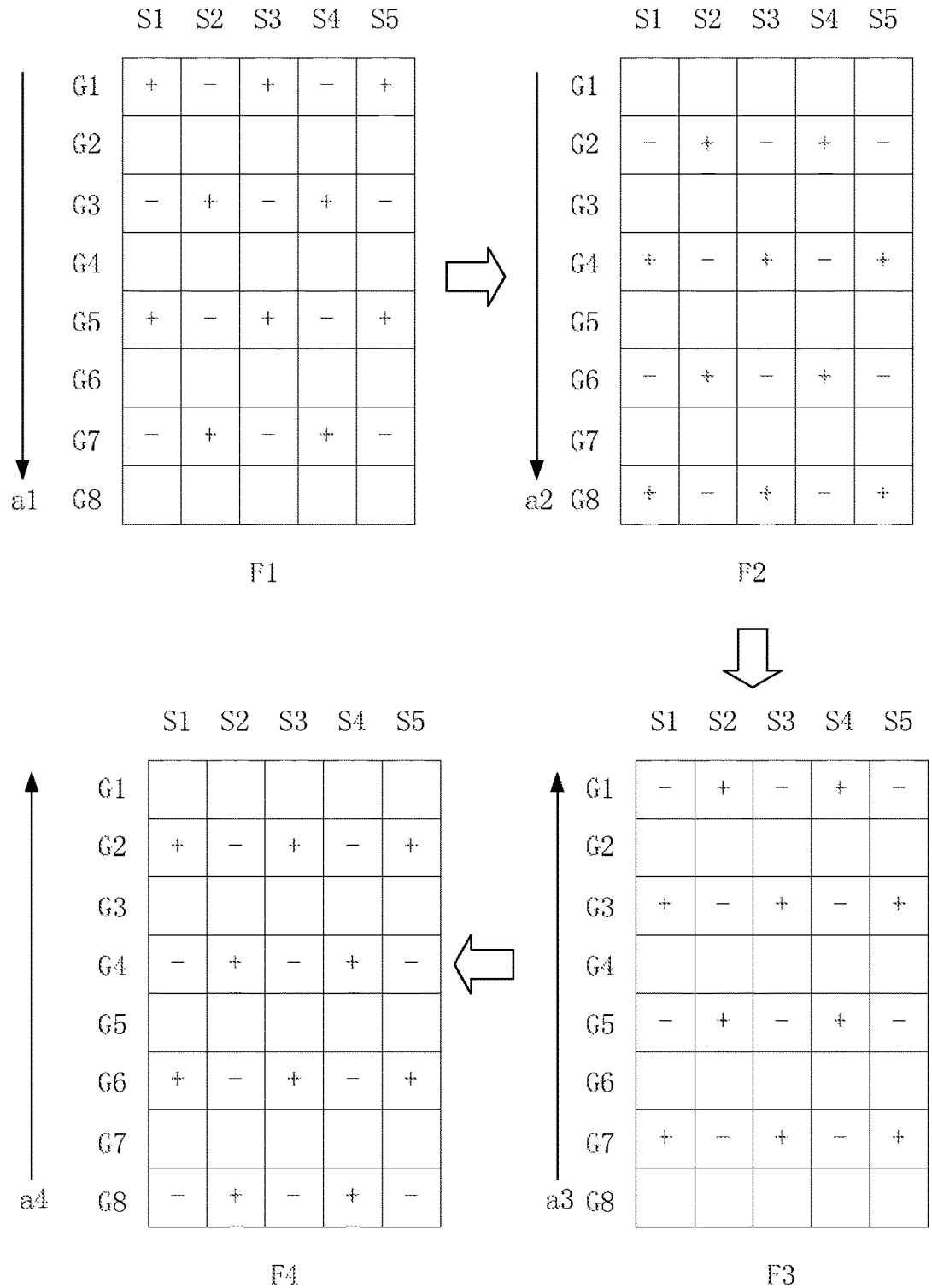
FIG. 5 depicts a schematic diagram of charging polarities of a 3D panel within one period of a method for driving a 3D panel according to an embodiment of the disclosure.
Figure 6:
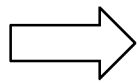
FIG. 6 schematically illustrates the principle of a 3D displaying when applying the method shown in FIG. 5.

The method in the disclosure is illustrated below based on a 3D panel having 8×5 pixel units arranged in an array. Polarities of the pixel units when displaying one 3D image are inversed with respect to polarities of the pixel units when displaying an adjacent 3D image if the method according to the embodiment is applied on the 3D panel. Reference may be made to FIG. 4 to FIG. 6. FIG. 4 is a waveform diagram of a data signal of a first data line S1 within one period, FIG. 5 is a schematic diagram of charging polarities of the 3D panel within one period of a driving method provided in the disclosure, and FIG. 6 schematically illustrates the principle of a 3D displaying when applying the driving method shown in FIG. 5.

Here k is set as 0, the first group of gate lines are all gate lines in odd-numbered rows, and the second group of gate lines are all gate lines in even-numbered rows, the first image and the third image are left-eye images, and the second image and the fourth image are right-eye images.

In a scan of a first frame F1, the gate lines in odd-numbered rows are driven row by row through a forward scan, that is, a scanning direction a1 of the first frame F1 is downward row by row, and gate lines G1, G3, G5 and G7 are scanned sequentially to display a left-eye image.

In a scan of a second frame F2, the gate lines in even-numbered rows are driven row by row through a forward scan, that is, a scanning direction a2 of the second frame F2 is downward row by row, and gate lines G2, G4, G6 and G8 are scanned sequentially to display a right-eye image.

In a scan of a third frame F3, the gate lines in odd-numbered rows are driven row by row through a reverse scan, that is, a scanning direction a3 of the third frame F3 is upward row by row, and gate lines G7, G5, G3 and G1 are scanned sequentially to display a left-eye image. Since the scanning direction of the first frame F1 is opposite to that of the third frame F3, polarities in scanning the third frame F3 are inversed with respect to polarities in scanning the first frame F1 under a set data signal.

In a scan of a fourth frame F4, the gate lines in even-numbered rows are driven row by row through a reverse scan, that is, a scanning direction a4 of the fourth frame F4 is upward row by row, and gate lines G8, G6, G4 and G2 are scanned sequentially to display a right-eye image. Since the scanning direction of the second frame F2 is opposite to the scanning direction of the fourth frame F4, polarities in scanning the fourth frame F4 are inversed with respect to polarities in scanning the second frame F2 under the set data signal.

Therefore, as shown in FIG. 6, polarities of the pixel unit when displaying a second 3D image constituted by the third frame F3 and the fourth frame F4 are inversed with respect to polarities of the pixel units when displaying a first 3D image constituted by the first frame F1 and the second frame F2.

As described above, if the number of the gate lines in odd-numbered rows or the number of the gate lines in even-numbered rows is not an even number, such as, in case of applying a 3D panel having 7×5 pixel units, in a process of driving the gate lines in even-numbered rows, a gate driving circuit needs to perform one empty scanning at the last low level of each of the second frame F2 and the fourth frame F4 as shown in FIG. 4, to guarantee that displaying of 3D images corresponds to the timing sequence of the data signal, thereby leading to a normal 3D displaying.

Figure 7:
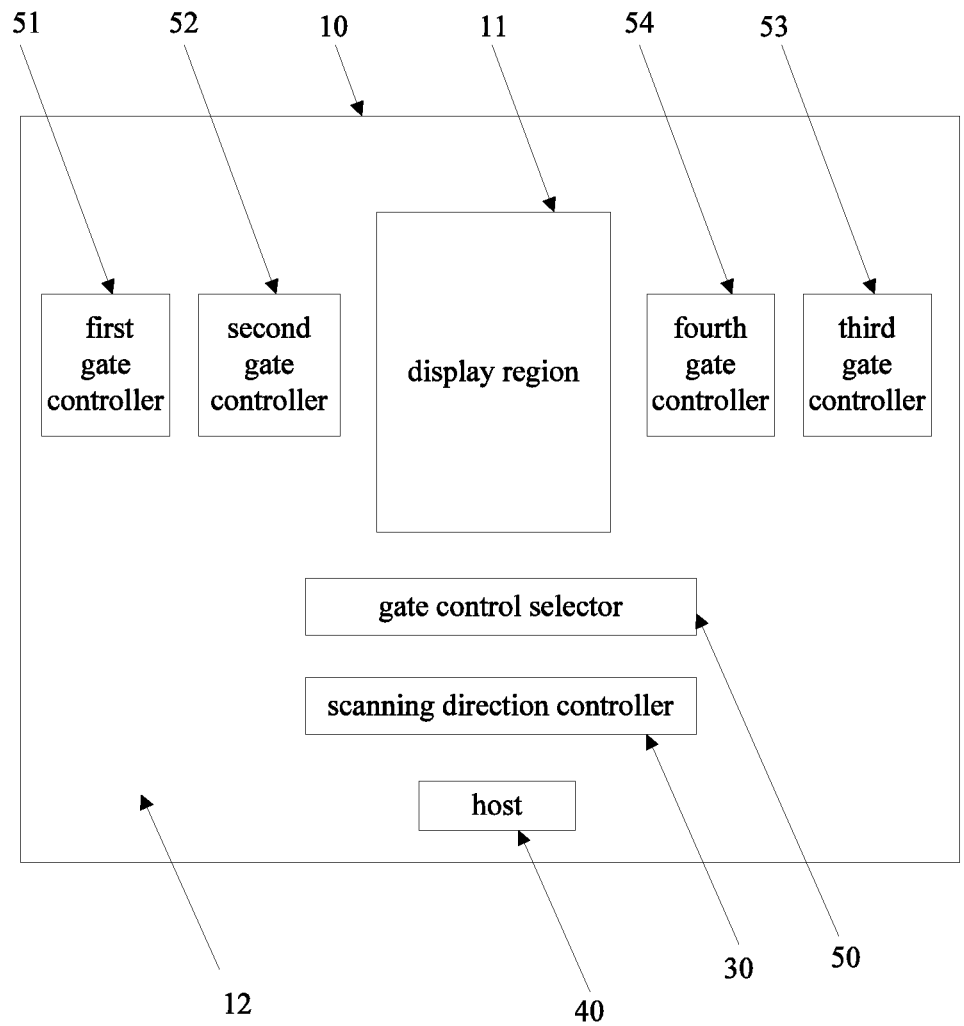
FIG. 7 depicts a schematic structural diagram of a layout of a 3D panel according to an embodiment of the disclosure.
Figure 8:
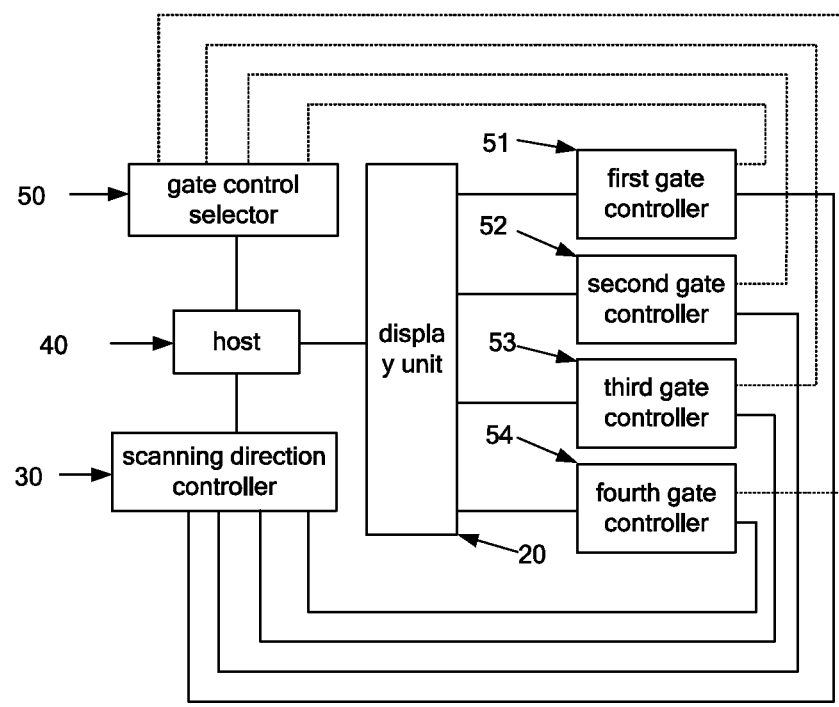
FIG. 8 depicts a schematic diagram showing connections of respective structures of the 3D panel shown in FIG. 7.

With reference to FIG. 7 and FIG. 8, a 3D panel 10 is further provided according to an embodiment of the disclosure, based on the method described above. FIG. 7 is a schematic structural diagram of a layout of the 3D panel according to the embodiment of the disclosure, and FIG. 8 is a schematic diagram showing connections between respective structures in the 3D panel 10 shown in FIG. 7. Polarities when displaying one 3D image may be inversed with respect to polarities when displaying an adjacent 3D image if the above method is applied to drive the 3D panel 10 to perform a 3D displaying.

The 3D panel 10 includes a display region 11 and a border region 12 around the display region 11. The display region 11 is provided with a display unit 20, and the display unit 20 includes multiple pixel units arranged in an array, multiple gate lines and multiple data lines. The border region 12 is provided with a gate driving circuit and a scanning direction controller 30.

In performing the 3D displaying, the gate driving circuit drives a first group of gate lines row by row in a scan of a (4k+1)-th frame, to display a first image, where k is a natural number; drives a second group of gate lines row by row in a scan of a (4k+2)-th frame, to display a second image; drives the first group of gate lines row by row in a scan of a (4k+3)-th frame, to display a third image; and drives the second group of gate lines row by row in a scan of a (4k+4)-th frame, to display a fourth image.

The scanning direction controller 30 controls a scanning direction of the gate driving circuit, controls a scanning direction of the (4k+1)-th frame to be opposite to that of the (4k+3)-th frame, and controls a scanning direction of the (4k+2)-th frame to be opposite to that of the (4k+4)-th frame.

Specifically, one of the first image and the second image is a left-eye image, and the other is a right-eye image; one of the third image and the fourth image is a left-eye image, and the other is a right-eye image. Gate lines in the first group of gate lines are gate lines in odd-numbered rows, and gate lines in the second group of gate lines are gate lines in even-numbered rows. Alternatively, gate lines in the second group of gate lines are gate lines in odd-numbered rows, and gate lines in the first group of gate lines are gate lines in even-numbered rows.

A host 40 is configured to output a data signal and a gate scanning signal. The host 40 is further configured to output data of an upside down image before driving a group of gate lines corresponding to a frame on which a reverse scan needs to be applied.

In the embodiment, the gate driving circuit includes a gate control selector 50, a first gate controller 51, a second gate controller 52, a third gate controller 53 and a fourth gate controller 54. The first gate controller 51 is configured to scan the (4k+1)-th frame, the second gate controller 52 is configured to scan the (4k+2)-th frame, the third gate controller 53 is configured to scan the (4k+3)-th frame, the fourth gate controller 54 is configured to scan the (4k+4)-th frame, and the gate control selector 50 is configured to control respective gate controllers to perform driving controls in time durations of frames corresponding to the respective gate controllers.

The host 40 is connected to the display unit 20, the gate control selector 50 and the scanning direction controller 30. The display unit 20 is connected to each of the first gate controller 51, the second gate controller 52, the third gate controller 53 and the fourth gate controller 54. The gate control selector 50 is connected to each of the first gate controller 51, the second gate controller 52, the third gate controller 53 and the fourth gate controller 54. The scanning direction controller 30 is connected to each of the first gate controller 51, the second gate controller 52, the third gate controller 53 and the fourth gate controller 54.

Figure 9:
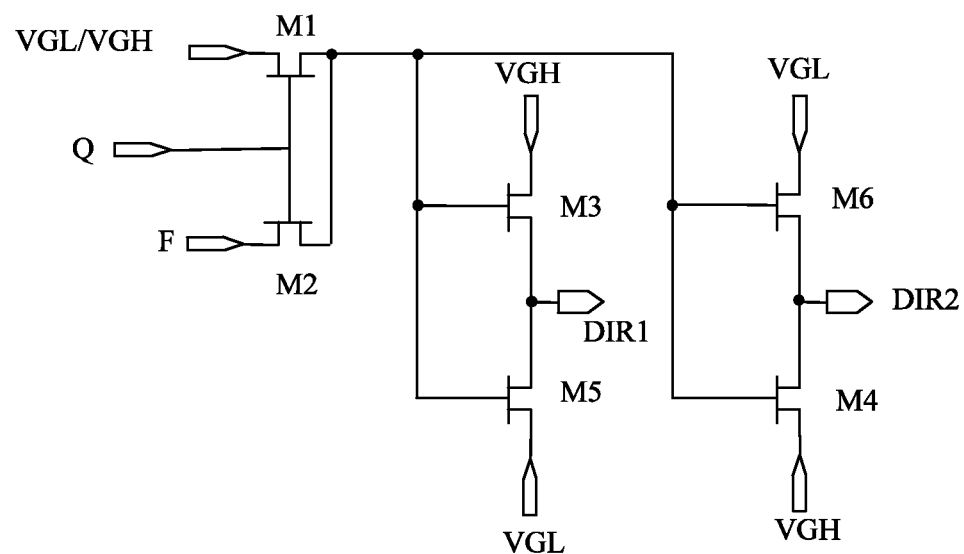
FIG. 9 depicts a circuit diagram of a scanning direction controller according to an embodiment of the disclosure.

FIG. 9 is a circuit diagram of a scanning direction controller 30 according to an embodiment of the disclosure. As shown in FIG. 9, the scanning direction controller 30 includes a 2D/3D control end Q, a scanning direction control end F and an output end, and the output end includes a first output end DIR1 and a second output end DIR2. Each gate controller is connected to the first output end DIR1 and the second output end DIR2.

In a 2D displaying mode, the 2D/3D control end Q is connected to a 2D mode control signal, and the output end controls the gate driving circuit to perform a forward scan or a reverse scan based on a scanning direction signal connected to the scanning direction control end F. In the 2D displaying, the forward scan is performed on gate lines corresponding to each frame, or the reverse scan is performed on gate lines corresponding to each frame.

In a 3D displaying mode, the 2D/3D control end Q is connected to a 3D mode control signal, and the output end controls the gate driving circuit to sequentially perform a forward scan and a reverse scan based on a scanning direction signal connected to the scanning direction control end F. Accordingly, the forward scan is performed in a corresponding frame and the reverse scan is performed in a corresponding frame. That is, the forward scan is controlled to be performed on gate lines corresponding to a frame for which the forward scan is needed and the reverse scan is controlled to be performed on gate lines corresponding to a frame for which the reverse scan is needed.

The scanning direction controller 30 includes a first transistor M1 to a sixth transistor M6. The first transistor M1, the third transistor M3 and the fourth transistor M4 are N-channel Metal Oxide Semiconductors (NMOSs), and the second transistor M2, the fourth transistor M4 and the fifth transistor M5 are P-channel Metal Oxide Semiconductors (PMOSs).

A source of the first transistor M1 is connected to a first reference voltage VGH or a second reference voltage VGL, a gate of the first transistor M1 is connected to the 2D/3D control end, and a drain of the first transistor M1 is connected to a drain of the second transistor M2. Specifically, the first reference voltage VGH is greater than the second reference voltage VGL.

A source of the second transistor M2 is connected to the scanning direction control end F, and a gate of the second transistor M2 is connected to the 2D/3D control end Q.

A source of the third transistor M3 is connected to the first reference voltage VGH, a gate of the third transistor M3 is connected to the drain of the second transistor M2, and a drain of the third transistor M3 is connected to the first output end DIR1.

A source of the fourth transistor M4 is connected to the first reference voltage VGH, a gate of the fourth transistor M4 is connected to the gate of the third transistor M3, and a drain of the fourth transistor M4 is connected to the second output end DIR2.

A source of the fifth transistor M5 is connected to the second reference voltage VGL, a gate of the fifth transistor M5 is connected to the gate of the third transistor M3, and a drain of the fifth transistor M5 is connected to the first output end DIR1.

A source of the sixth transistor M6 is connected to the second reference voltage VGL, a gate of the sixth transistor M6 is connected to the gate of the third transistor M3, and a drain of the sixth transistor M6 is connected to the second output end DIR2.

In the circuit shown in FIG. 9, both the first output end DIR1 and the second output end DIR2 are connected to each of the first gate controller 51, the second gate controller 52, the third gate controller 53 and the fourth gate controller 54.

In the 3D displaying mode, the scanning direction control end F is connected to a sequential scanning direction signal. If the scanning direction signal is at a high level, the first output end DIR1 outputs the first reference voltage VGH and the second output end DIR2 outputs the second reference voltage VGL. In this case, the output end controls the gate driving circuit to perform the forward scan. If the scanning direction signal is at a low level, the first output end DIR1 outputs the second reference voltage VGL and the second output end DIR2 outputs the first reference voltage VGH. In this case, the output end controls the gate driving circuit to perform the reverse scan. An output of the first output end DIR1 and an output of the second output end DIR2 functions together to control the scanning direction of a corresponding gate controller, the forward scan is performed in a case that DIR1 outputs VGH and DIR2 outputs VGL, and the reverse scan is performed in a case that DIR1 outputs VGL and DIR2 outputs VGH.

It can be known from the above description that 3D displaying and 2D displaying can be realized with the 3D display panel according to the embodiment of the disclosure. In performing the 3D displaying, polarity reversal of each pixel unit can be realized when applying the driving method in the embodiment of the disclosure to perform a switch from one 3D image to an adjacent 3D image, thereby avoiding the ghosting problem.

Figure 10:
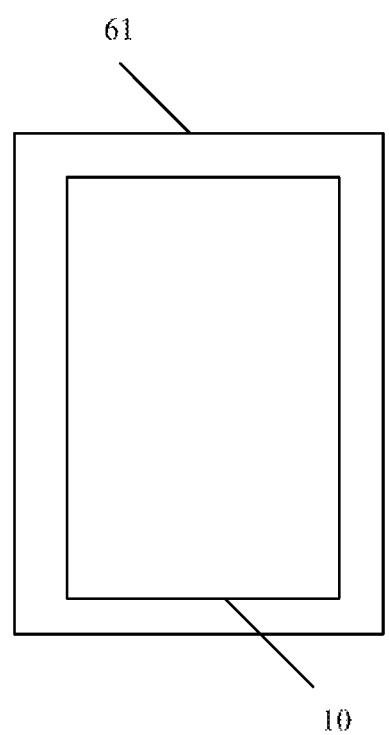
FIG. 10 depicts a schematic structural diagram of an electronic device according to an embodiment of the disclosure.

FIG. 10 is a schematic structural diagram of an electronic device 61 according to an embodiment of the disclosure. As shown in FIG. 10, the electronic device 61 includes the 3D panel 10 described in the previous embodiment. The electronic device 61 is a computer, a television or a cell phone.

The 3D panel 10 is applied in the electronic device described in the embodiment; therefore, the polarity reversal of each pixel unit can be realized when performing a switch from one 3D image to an adjacent 3D image, thereby avoiding the ghosting problem.

Based on the embodiments disclosed above, the disclosure can be realized or used by those skilled in the art. Multiple modifications to these embodiments are obvious to those skilled in the art, and general principles defined in the specification can be realized in other embodiments without departing from the spirit or scope of the disclosure. Therefore, the disclosure is not limited to these embodiments shown in the specification and conforms to a widest scope consistent with the principle and novel characteristics disclosed in the specification.

What is claimed is:

1. A 3D panel, comprising:
   a plurality of gate lines;
   a gate driving circuit,
   wherein in a 3D displaying, the gate driving circuit is configured to drive a first group of gate lines row by row in a scan of a (4k+1)-th frame for displaying a first image, where k is a natural number, to drive a second group of gate lines row by row in a scan of a (4k+2)-th frame for displaying a second image, to drive the first group of gate lines row by row in a scan of a (4k+3)-th frame for displaying a third image and to drive the second group of gate lines row by row in a scan of a (4k+4)-th frame for displaying a forth image; and
   a scanning direction controller,
   wherein the scanning direction controller is configured to control a scanning direction of the gate driving circuit, by keeping a scanning direction of the (4k+1)-th frame opposite to a scanning direction of the (4k+3)-th frame, and a scanning direction of the (4k+2)-th frame opposite to a scanning direction of the (4k+4)-th frame;
   wherein one of the first image and the second image is a left-eye image and the other is a right-eye image;
   wherein one of the third image and the fourth image is a left-eye image and the other is a right-eye image;
   wherein the first group of gate lines is in odd-numbered rows and the second group of gate lines is in even-numbered rows, or the first group of gate lines is in even-numbered rows and the second group of gate lines is in odd-numbered rows;
   wherein the scanning direction controller comprises a 2D/3D control end, a scanning direction control end and an output end, and the output end comprises a first output end and a second output end;
   wherein in a 2D displaying mode, the 2D/3D control end is connected to a 2D mode control signal, and wherein the output end controls the gate driving circuit to perform a forward scan or a reverse scan based on a scanning direction signal from the scanning direction control end; and
   wherein in a 3D displaying mode, the 2D/3D control end is connected to a 3D mode control signal, and the output end controls the gate driving circuit to sequentially perform a forward scan and a reverse scan based on a scanning direction signal from the scanning direction control end, wherein the forward scan and the reverse scan are respectively performed on corresponding frames.

2. The 3D panel according to claim 1, further comprising a host, wherein the host is configured to output data of an upside down image before scanning a frame on which a reverse scan is to be applied.

3. The 3D panel according to claim 1, wherein the gate driving circuit comprises a gate control selector, a first gate controller, a second gate controller, a third gate controller and a fourth gate controller;
   wherein the first gate controller is configured to scan the (4k+1)-th frame the second gate controller is configured to scan the (4k+2)-th frame, the third gate controller is configured to scan the (4k+3)-th frame, and the fourth gate controller is configured to scan the (4k+4)-th frame; and
   wherein the gate control selector is configured to control respective gate controllers to perform driving controls in time durations of frames corresponding to the respective gate controllers.

4. The 3D panel according to claim 1, wherein the scanning direction controller comprises a first transistor, a second transistor, a third transistor, a fourth transistor, a fifth transistor and a sixth transistor;
   wherein a source of the first transistor is connected to a first reference voltage or a second reference voltage, a gate of the first transistor is connected to the 2D/3D control end, and a drain of the first transistor is connected to a drain of the second transistor;
   wherein a source of the second transistor is connected to the scanning direction control end, and a gate of the second transistor is connected to the 2D/3D control end;
   wherein a source of the third transistor is connected to the first reference voltage, a gate of the third transistor is connected to the drain of the second transistor, and a drain of the third transistor is connected to the first output end;
   wherein a source of the fourth transistor is connected to the first reference voltage, a gate of the fourth transistor is connected to the gate of the third transistor, and a drain of the fourth transistor is connected to the second output end;
   wherein a source of the fifth transistor is connected to the second reference voltage, a gate of the fifth transistor is connected to the gate of the third transistor, and a drain of the fifth transistor is connected to the first output end; and
   wherein a source of the sixth transistor is connected to the second reference voltage, a gate of the sixth transistor is connected to the gate of the third transistor, and a drain of the sixth transistor is connected to the second output end.

5. The 3D panel according to claim 4, wherein the first transistor, the third transistor and the fourth transistor are N-channel Metal Oxide Semiconductors, and the second transistor, the fifth transistor and the sixth transistor are P-channel Metal Oxide Semiconductors;

wherein the first reference voltage is greater than the second reference voltage;

wherein in the 3D displaying mode, the scanning direction control end is connected to a sequential scanning direction signal;

wherein when the scanning direction signal is at a high level, the first output end outputs the first reference voltage, the second output end outputs the second reference voltage, and the output ends control the gate driving circuit to perform the forward scan; and when the scanning direction signal is at a low level, the first output end outputs the second reference voltage, the second output end outputs the first reference voltage, and the output ends control the gate driving circuit to perform the reverse scan.

6. An electronic device comprising a 3D panel, wherein the 3D panel comprises:

a plurality of gate lines;

a gate driving circuit, wherein in a 3D displaying, the gate driving circuit is configured to drive a first group of gate lines row by row in a scan of a (4k+1)-th frame for displaying a first image, where k is a natural number, to drive a second group of gate lines row by row in a scan of a (4k+2)-th frame for displaying a second image, to drive the first group of gate lines row by row in a scan of a (4k+3)-th frame for displaying a third image, and to drive the second group of gate lines row by row in a scan of a (4k+4)-th frame, to display for displaying a forth image; and a scanning direction controller, wherein the scanning direction controller is configured to control a scanning direction of the gate driving circuit, by keeping a scanning direction of the (4k+1)-th frame opposite to a scanning direction of the (4k+3)-th frame, and by keeping a scanning direction of the (4k+2)-th frame opposite to a scanning direction of the (4k+4)-th frame;

wherein one of the first image and the second image is a left-eye image and the other is a right-eye image; wherein one of the third image and the fourth image is a left-eye image and the other is a right-eye image; wherein the first group of gate lines is in odd-numbered rows and the second group of gate lines is in even-numbered rows, or the first group of gate lines is in even-numbered rows and the second group of gate lines is in odd-numbered rows;

wherein the scanning direction controller comprises a 2D/3D control end, a scanning direction control end and an output end, and the output end comprises a first output end and a second output end;

wherein in a 2D displaying mode, the 2D/3D control end is connected to a 2D mode control signal, and the output end controls the gate driving circuit to perform a forward scan or a reverse scan based on a scanning direction signal from the scanning direction control end; and wherein in a 3D displaying mode, the 2D/3D control end is connected to a 3D mode control signal, and the output end controls the gate driving circuit to sequentially perform a forward scan and a reverse scan based on a scanning direction signal from the scanning direction control end, wherein the forward scan and the reverse scan are respectively performed on corresponding frames.

7. The electronic device according to claim 6, wherein the electronic device is a computer, a television or a cell phone.

* * * * *